(12) United States Patent
Bourbonnais et al.

(10) Patent No.: US 10,216,582 B2
(45) Date of Patent: Feb. 26, 2019

(54) RECOVERY LOG ANALYTICS WITH A BIG DATA MANAGEMENT PLATFORM

(71) Applicant: International Business Machines Corporation, Armonk, NY (US)

(72) Inventors: Serge Bourbonnais, Palo Alto, CA (US); Austin F. M. D'Costa, Beaverton, OR (US); Yat On Lau, San Jose, CA (US); Xiao Li, San Jose, CA (US); Hong Min, Poughkeepsie, NY (US); Gong Su, New York, NY (US); Jonathan W. Wierenga, Lower Hutt (NZ); Christian Zentgraf, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 15/237,407

(22) Filed: Aug. 15, 2016

(65) Prior Publication Data

US 2018/0046551 A1 Feb. 15, 2018

(51) Int. Cl.
*G06F 17/00* (2006.01)
*G06F 11/14* (2006.01)
*G06F 17/30* (2006.01)

(52) U.S. Cl.
CPC .... *G06F 11/1451* (2013.01); *G06F 17/30303* (2013.01); *G06F 17/30368* (2013.01); *G06F 17/30377* (2013.01); *G06F 17/30581* (2013.01); *G06F 2201/80* (2013.01); *G06F 2201/82* (2013.01)

(58) Field of Classification Search
CPC ......... G06F 17/30303; G06F 17/30368; G06F 17/30377; G06F 17/30581
USPC ................................ 707/615, 639, 648, 649
See application file for complete search history.

(56) References Cited

U.S. PATENT DOCUMENTS

| 7,076,508 | B2 | 7/2006 | Bourbonnais et al. |
| 7,716,181 | B2 | 5/2010 | Todd |
| 8,108,299 | B1 * | 1/2012 | Waelbroeck ........... G06Q 40/04 705/37 |
| 8,239,389 | B2 | 8/2012 | Zagelow et al. |
| 8,296,269 | B2 | 10/2012 | Pareek et al. |
| 8,682,859 | B2 | 3/2014 | Gutlapalli et al. |
| 8,756,192 | B2 | 6/2014 | Wang et al. |

(Continued)

OTHER PUBLICATIONS

P. Kanhere et al., "A Methodology for Outlier Detection in Audit Logs for Financial Transactions", (C) 2015 IEEE, 2015 International Conference on Computing Communication Control and Automation, Feb. 26-27, 2015, Total 4 pages.

(Continued)

*Primary Examiner* — Dung K Chau
(74) *Attorney, Agent, or Firm* — Janaki K. Davda; Konrad, Raynes, Davda and Victor LLP

(57) ABSTRACT

Provided are techniques for replicating relational transactional log data to a big data platform. Change records contained in change data tables are fetched. A relational change history with transaction snapshot consistency is rebuilt to generate consistent change records by joining the change data tables and a unit of work table based on a commit sequence identifier. The consistent change records are stored on the big data platform, and queries are answered on the big data platform using the consistent change records.

14 Claims, 9 Drawing Sheets

(56) References Cited

U.S. PATENT DOCUMENTS

| | | |
|---|---|---|
| 8,874,512 B2 | 10/2014 | Jin et al. |
| 2004/0199552 A1 | 10/2004 | Ward et al. |
| 2012/0084260 A1 | 4/2012 | Cherkauer et al. |
| 2012/0109906 A1 | 5/2012 | Wagner |
| 2014/0195489 A1 | 7/2014 | Wang et al. |
| 2015/0088844 A1* | 3/2015 | Stigsen ............ G06F 17/30312 707/703 |
| 2015/0149704 A1 | 5/2015 | Lee et al. |
| 2017/0006135 A1* | 1/2017 | Siebel ..................... H04L 67/02 |
| 2017/0083380 A1* | 3/2017 | Bishop ................. G06F 9/5083 |
| 2017/0083386 A1* | 3/2017 | Wing ...................... G06F 9/542 |
| 2017/0255528 A1* | 9/2017 | Kedia ................. G06F 11/1469 |
| 2017/0351585 A1* | 12/2017 | Bourbonnais ..... G06F 17/30575 |

OTHER PUBLICATIONS

C. Liu et al., "Capturing Global Transactions From Multiple Recovery Log Files in a Partitioned Database System", VLDB'03, Proceedings of The 29th International Conference on Very Large Databases, vol. 29, 2003, Total 10 pages.

"Envision: Massively Scalable Curation and Analytics of Live Data" (online), retrieved from the Internet on Apr. 7, 2016 at URL > http:https://w3-connections.ibm.com/blogs/HackSparkReg/entry/Time_Capsu . . . Total 5 pages.

Li et al., "Envision: Massively Scalable Curation and Analytics of Live Data" dated May 21, 2015, IBM Research and Analytics, Total 9 pages.

Li et al., "Envision: Massively Scalable Curation and Analytics of Live Data" dated May 21, 2015, IBM Research and Analytics, Total 4 pages.

"InfoSphere Data Replication (SQL Replication)", (online) retrieved from the Internet on Aug. 26, 2015 at URL>http:http://www.ibm.com/developerworks/data/roadmaps/sqlrepl-roadmap.html, Total 3 pages.

Mell et al., "Effectively and Securely Using the Cloud Computing Paradigm", dated Oct. 7, 2009, NIST, Information Technology Laboratory, Total 80 pages.

Mell et al., "The NIST Definition of Cloud Computing" dated Sep. 2011, Computer Society, Recommendations of the National Institute of Standards and Technology, Total 7 pages.

Wikipedia, "Snapshot Isolation", (online), retrieved from the Internet on Aug. 2, 2016 at URL>http:https://en.wikipedia.org/wiki/Snapshot_isolation, Total 4 pages.

US Patent Application, dated Dec. 21, 2017, for U.S. Appl. No. 15/851,336, filed Dec. 21, 2017, invented by Serge Bourbonnais et al., Total 41 pages.

Preliminary Amendment, dated Dec. 21, 2017, for U.S. Appl. No. 15/851,336, filed Dec. 21, 2017, invented by Serge Bourbonnais et al., Total 5 pages.

List of IBM Patents or Patent Applications Treated as Related, dated Dec. 21, 2017, pp. 2.

Notice of Allowance, dated Oct. 3, 2018, for U.S. Appl. No. 15/851,336, filed Dec. 21, 2017, invented by Serge Bourbonnais et al., Total 19 pages.

* cited by examiner

RECOVERY LOG ANALYTICS WITH A BIG DATA MANAGEMENT PLATFORM

FIELD

Embodiments of the invention relate to recovery log analytics with a big data management platform.

BACKGROUND

Transactions include Create, Read, Update, and Delete (CRUD) operations. A transaction's writeset refers to data being operated with CRUD operations. Replication replicates (copies) data from a source data store (e.g., a source DataBase Management System (DBMS)) to one or more target data stores via one or more logical end-to-end replication channels. The DBMS has a recovery log captures the change history of the DBMS transactional data.

The emergence of big data platforms, such as the Apache® Hadoop® platform and the Apache® Spark platform, offer more opportunities for exploring analytics on data processed with a DBMS. (Apache and Hadoop are registered trademarks of the Apache Software Foundation in the United States and/or other countries.)

However, existing solutions do not make the consistent change history available on the big data platform.

SUMMARY

Provided is a method for replicating relational transactional log data to a big data platform. Change records contained in change data tables are fetched. A relational change history with transaction snapshot consistency is rebuilt to generate consistent change records by joining the change data tables and a unit of work table based on a commit sequence identifier. The consistent change records are stored on the big data platform, and queries are answered on the big data platform using the consistent change records.

Provided is a computer program product for replicating relational transactional log data to a big data platform. The computer program product comprises a computer readable storage medium having program code embodied therewith, the program code executable by at least one processor to perform operations. Change records contained in change data tables are fetched. A relational change history with transaction snapshot consistency is rebuilt to generate consistent change records by joining the change data tables and a unit of work table based on a commit sequence identifier. The consistent change records are stored on the big data platform, and queries are answered on the big data platform using the consistent change records.

Provided is a computer system for replicating relational transactional log data to a big data platform. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Change records contained in change data tables are fetched. A relational change history with transaction snapshot consistency is rebuilt to generate consistent change records by joining the change data tables and a unit of work table based on a commit sequence identifier. The consistent change records are stored on the big data platform, and queries are answered on the big data platform using the consistent change records.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a scalable mechanism of efficiently replicating DBMS transactional log data to big data platforms. Embodiments capture the changed data, apply changes in the unit of transaction consistency to the data previously replicated to big data platforms, and enable querying on those data.

Figure 1:
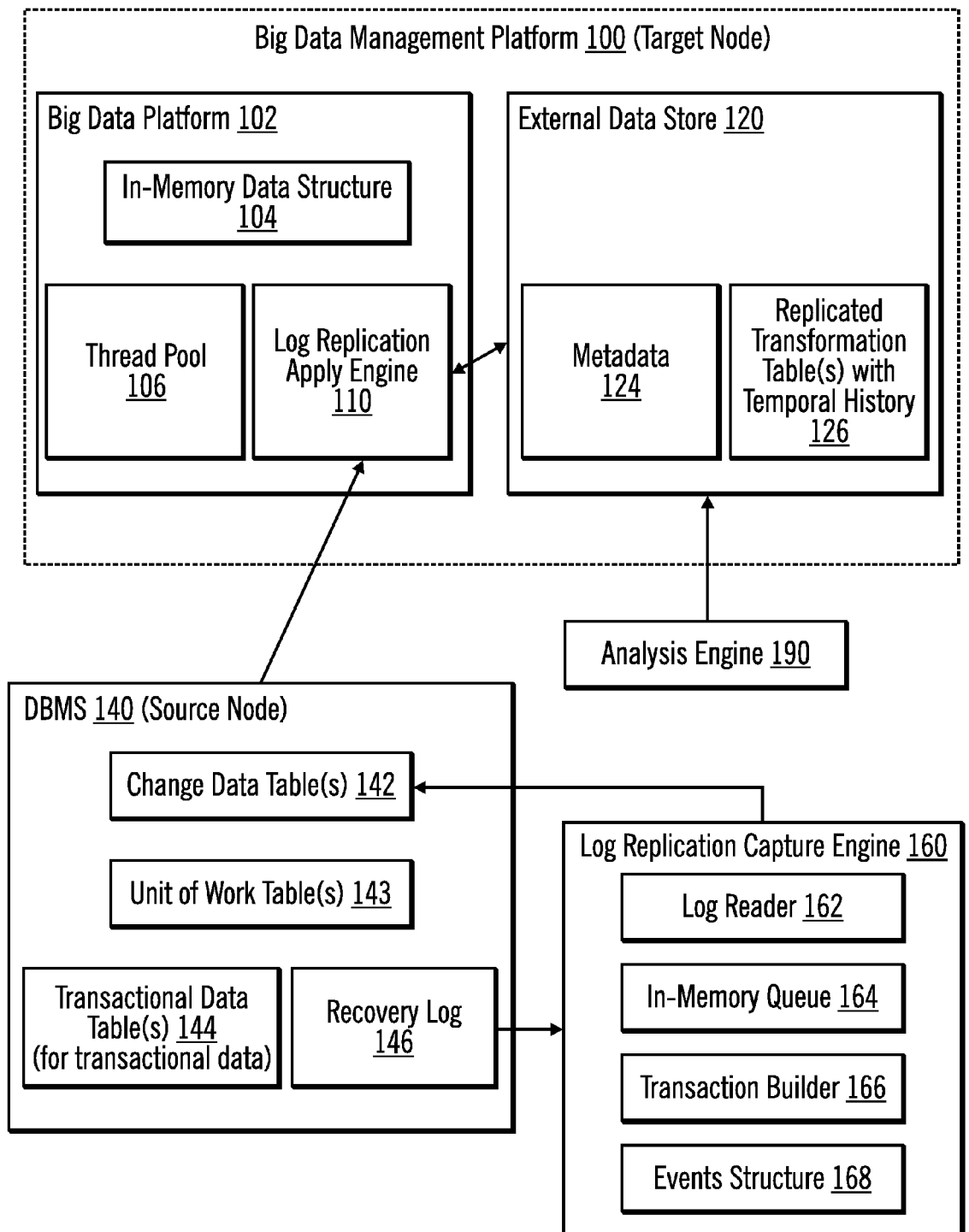
FIG. 1 illustrates, in a block diagram, a computing environment in accordance with certain embodiments.

FIG. 1 illustrates, in a block diagram, a computing environment in accordance with certain embodiments. A big data management platform 100 is a target node that includes a big data platform 110 and an external data store 120. A big data platform 102 is coupled to an external data store 120 and a Database Management System (DBMS) 140. The big data platform 102 includes an in-memory data structure 104, a thread pool 106, and a log replication apply engine 110 ("apply engine").

The external data store 120 includes metadata 124 and one or more replicated transformation tables with temporal history 126 ("replicated tables" or "replicated transformation tables"). The external data store 120 also is coupled to an analysis module 190, which may analyze data stored in the external data store. For example, the analysis module 190 may perform analysis functions for business analytics, such as inspection, aggregation, modeling etc.

The DBMS 140 may be described as a source data store or source node. The DBMS 140 is coupled to a log replication capture engine 160 ("capture engine"). The DBMS 140 includes one or more change data tables 142, one or more Unit of Work (UOW) tables 143, one or more other transactional data tables 144, and a recovery log 146 storing transactions. The one or more change data tables 142 may be persistent. The transactional data tables 144 store DBMS transactional data (as records or rows). With embodiments, the columns of the transactional data tables may be defined by users. The recovery log 146 may also be referred to as a transaction log and may be persistent.

The capture engine 160 includes a log reader 162, an in-memory queue 164, a transaction builder 166, and an events structure 168. The events structure 168 may be a table or a queue.

Embodiments introduce replication middleware that includes the apply engine 110 and the capture engine 160. With embodiments, the capture engine 160 may reside in the same system as the DBMS 140. The capture engine 160 is responsible for decoding recovery log entries, rebuilding transactions, and writing committed changes to the change data table 142 in the DBMS 140. With embodiments, there is one change data table 142 defined for each transactional data table 144. These change data tables 142 act as data staging buffers ("staging areas") that are accessed by both the capture engine 160 and the apply engine 110.

With embodiments, for optimal performance and minimal overhead, the change data tables 142 are defined "NOT LOGGED" and accessed without locking. If the DBMS 140 fails, their content may be recaptured from the persistent recovery log 146.

The apply engine 110 runs parallel jobs (e.g., Apache® Spark® jobs) to subscribe new log entries in the change data tables 142 via Structured Query Language (SQL) (e.g., Apache® Spark® SQL) and to build the replicated tables 126. Subscribing the log entries refers to selectively choosing which log entries to receive. In certain embodiments, the selection of log entries may be configured using a filtering parameter. In other embodiments, the selection of log entries may be configured to receive all log entries. With embodiments, there is one replicated table 126 defined for each transactional data table 144. In certain embodiments, the replicated tables have a columnar storage format (e.g., an Apache® Parquet® format). (Parquet is a registered trademark of the Apache Software Foundation in the United States and/or other countries.)

In certain embodiments, the replication solution has a capture engine 160 at the source node and an apply engine 110 at the target node. The capture engine 160 reads changes of committed transactions from the recovery log at a source node and sends them to the apply engine 110 running on a target node. The target node then replays the changes of the transactions.

With embodiments, the source node may be said to publish data changes, while the target node subscribes the changes. Different target nodes may request different changes from different tables of the DBMS 140 at the source node. A subscription may be described as a request for specific changes that are to be replicated at the target node.

Figure 2:
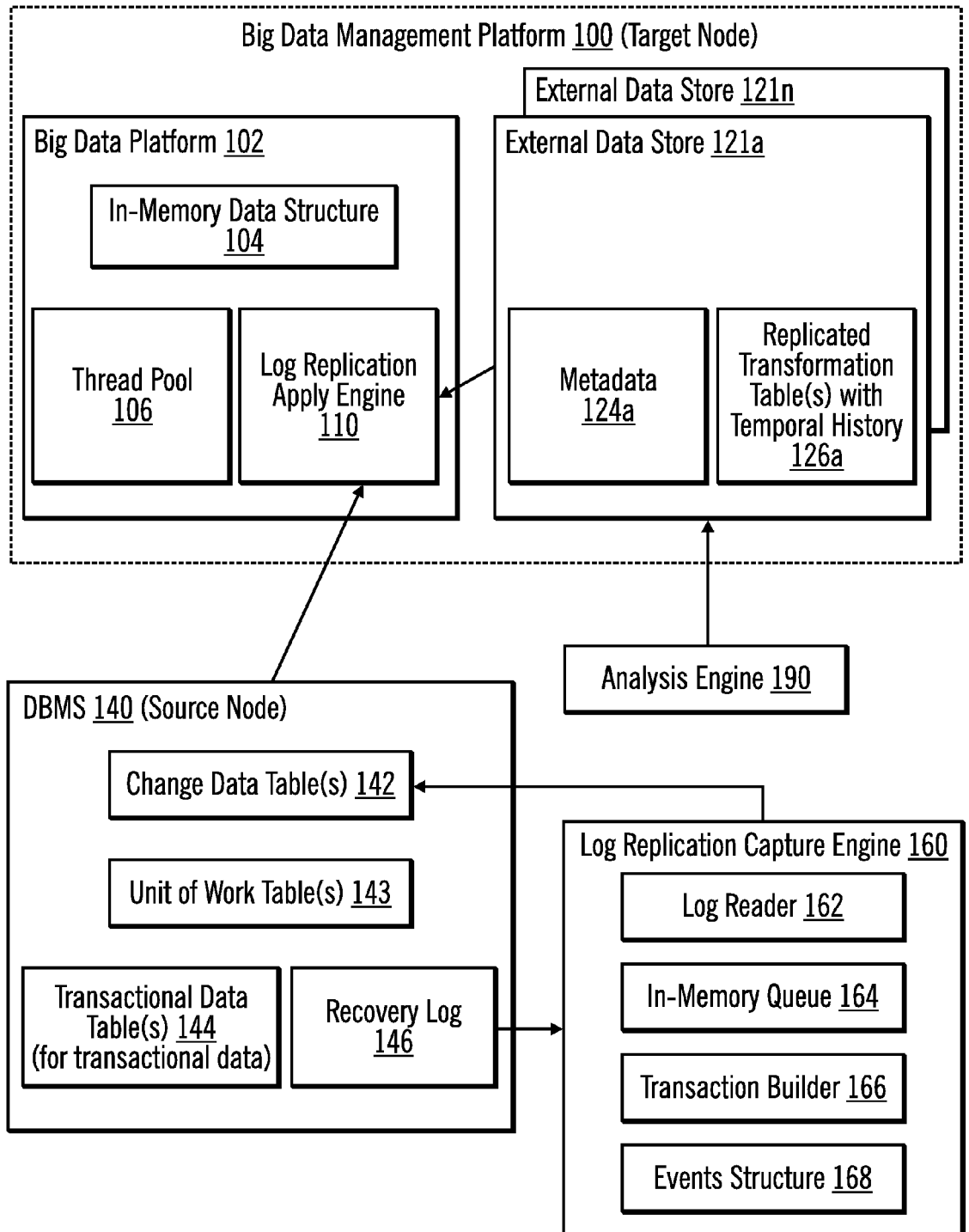
FIG. 2 illustrates, in a block diagram, a computing environment with multiple, external data stores in accordance with certain embodiments.

FIG. 2 illustrates, in a block diagram, a computing environment with multiple, external data stores in accordance with certain embodiments. In FIG. 2, there are multiple external data stores 121a . . . 121n. In certain embodiments, the multiple external data stores 121a . . . 121n may be heterogeneous data stores. In other embodiments, the multiple external data stores 121a . . . 121n may be homogenous data stores. Each of the external data stores 121a . . . 121n includes metadata and one or more replicated transformation tables with temporal history ("replicated tables" or "replicated transformation tables"). For example, the external data store 121a includes metadata 124a and one or more replicated transformation tables with temporal history 126a ("replicated tables" or "replicated transformation tables").

In certain embodiments, the external data store 120 is a big, distributed, persistent, fault-tolerant hash table. In certain embodiments, the external data store 120 is a Hadoop® Distributed File System (HDFS). (Hadoop is a registered trademark of the Apache Software Foundation in the United States and/or other countries.) The HDFS may be described as a distributed, scalable, and portable file-system. In other embodiments, the external data store 120 is an object store over HDFS. In certain embodiments, the big data platform 102 is an Apache® Spark platform with Spark clusters.

The recovery log 146 captures the change history of the DBMS transactional data. With embodiments, the recovery log 146 is available on the big data platforms, and this enables use cases, such as history trend analysis, compliance monitoring, online fraud detection, online preference recommendation, transaction hot-spot identification, queryable data archive of the DBMS, data access pattern correlation, credit investigation, and online DBMS data exploration and visualization.

Embodiments efficiently replicate the data changes from the recovery log 146 into these big data platforms in a scalable fashion for further analysis and analytics exploration.

Figure 3A:
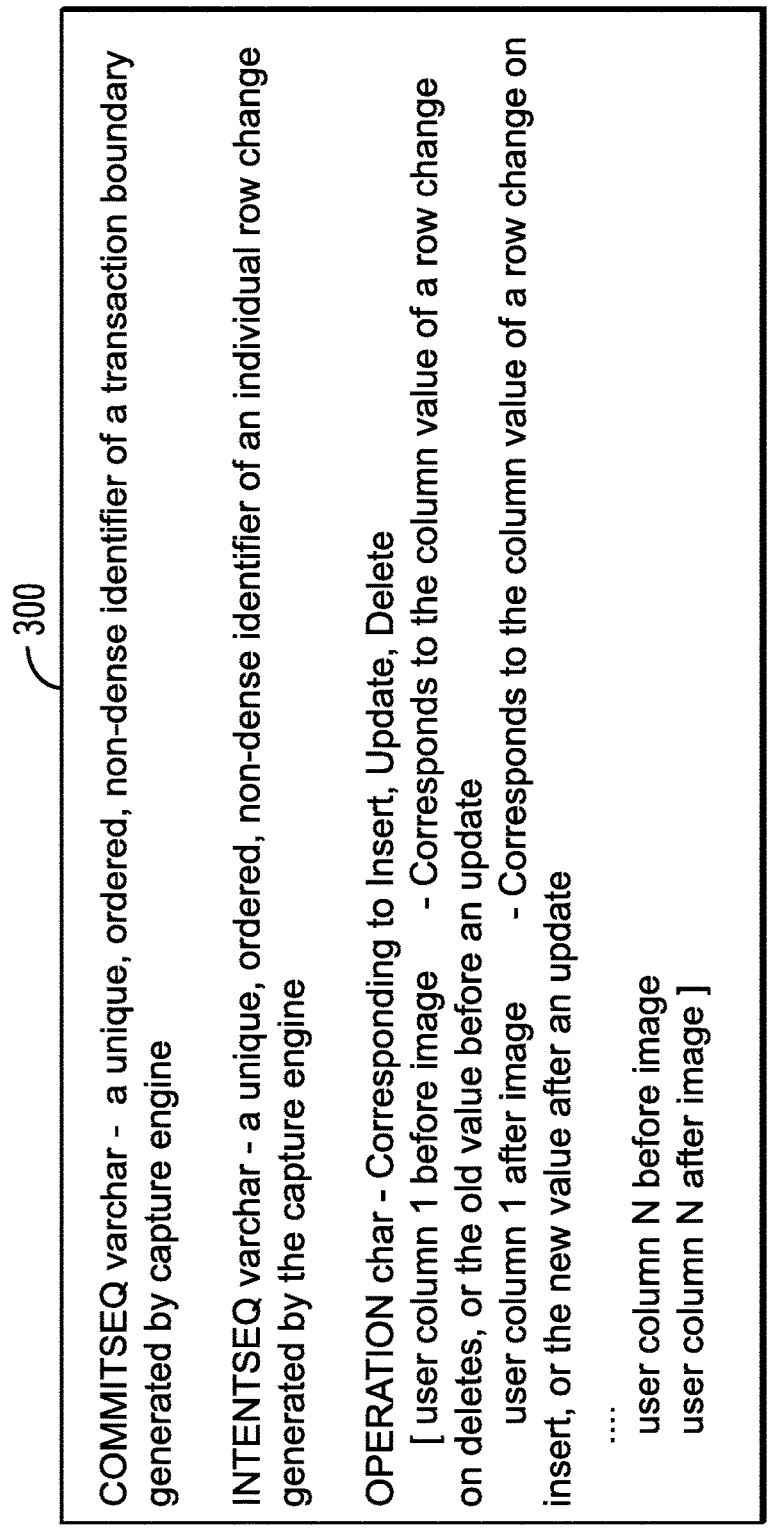
FIG. 3A illustrates a schema for a change data table in accordance with certain embodiments.

The capture engine 160 writes committed changes to the change data table 142. FIG. 3A illustrates a schema 300 for a change data table in accordance with certain embodiments. According to the schema 300, the change data table includes a column for COMMITSEQ, a column for INTENTSEQ, and a column for OPERATION as follows:

COMMITSEQ column is a unique, ordered, non-dense identifier of a transaction boundary generated by the capture engine. This is a commit sequence identifier and represents the log record sequence number of the captured commit statement.

INTENTSEQ column is varchar and is a unique, ordered, non-dense identifier of an individual row change generated by the capture engine.

OPERATION is char and has a value of one of Insert, Update, Delete with parameters of:
[ user column 1 before image—Corresponds to the column value of a row change on deletes, or the old value before an update
user column 1 after image—Corresponds to the column value of a row change on insert, or the new value after an update
. . .
user column N before image
user column N after image]

Figure 3B:
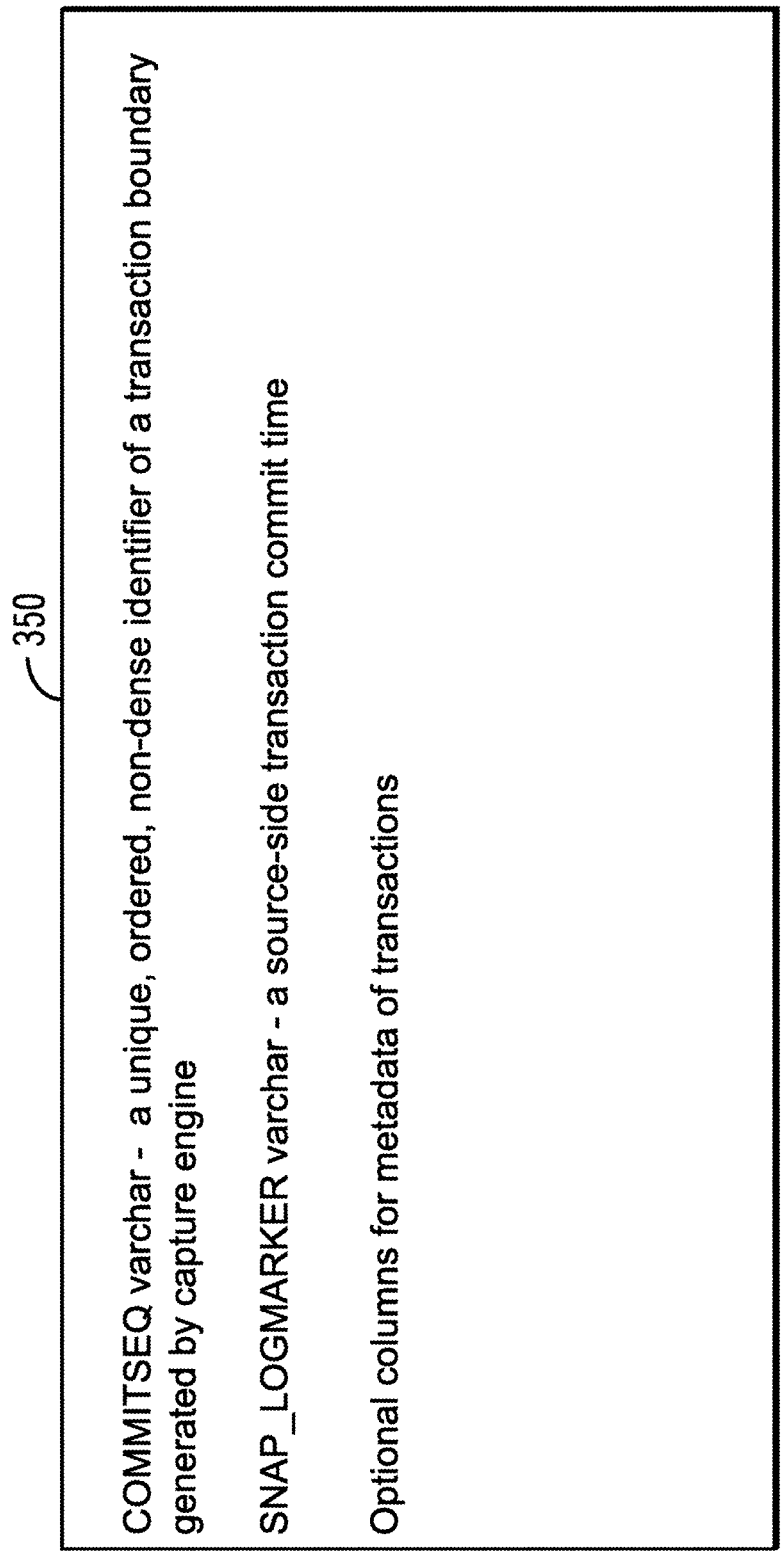
FIG. 3B illustrates a schema for a unit of work table in accordance with certain embodiments.

The UOW tables 143 are generated from the recovery log 146 by the capture engine 160. The UOW tables 143 is used to record the transaction metadata fetched/decoded from the recovery log 146. FIG. 3B illustrates a schema 350 for a UOW table in accordance with certain embodiments. According to the schema 350, the UOW table includes a column for COMMITSEQ, a column for SNAP_LOG-MARKER, and optional columns as follows:

COMMITSEQ: column is a unique, ordered, non-dense identifier of a transaction boundary generated by the capture engine. This is a commit sequence identifier and represents the log record sequence number of the captured commit statement.

SNAP_LOGMARKER: column is a source-side transaction commit time. This column records the source-side time that the data was committed.

The other optional columns may be the metadata of these transactions (e.g., a user id of a user who submitted the transactions).

Figure 4:
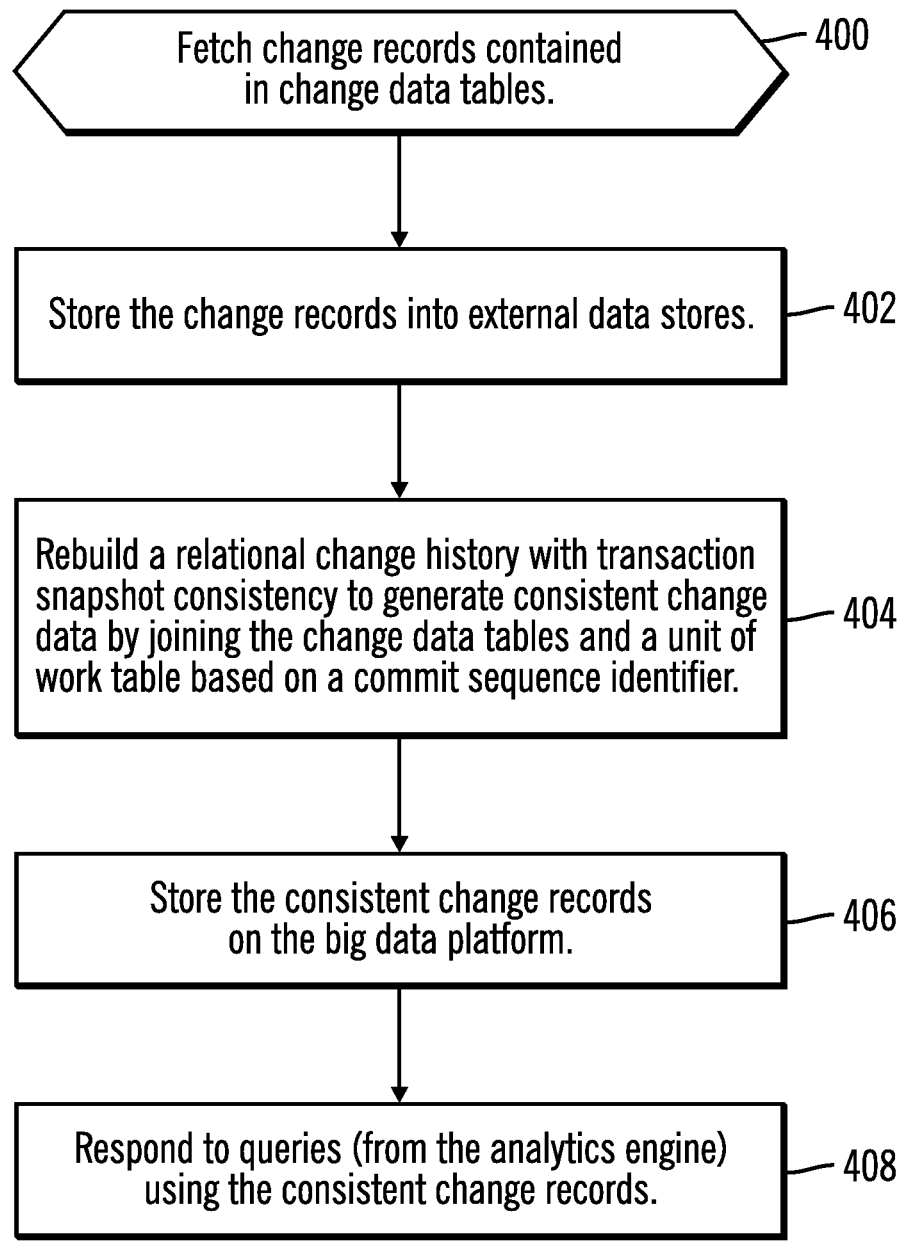
FIG. 4 illustrates, in a flow chart, operations for recovery log analytics in accordance with certain embodiments.

FIG. 4 illustrates, in a flow chart, operations for recovery log analytics in accordance with certain embodiments. Control begins at block 400 with the apply engine 110 fetching change records (i.e., DBMS changes) contained in the change data tables 142. In block 402, the apply engine 110 stores the change records into the external data stores in replicated tables 126.

With embodiments, the apply engine 110 fetches change records contained in the change data tables 142, which are consumed into multiple HDFS and Spark clusters. With embodiments, the apply engine 110, which may be a long-running multi-threaded application (e.g., a Spark application), retrieves data from the change data tables 146 and replicates data to a Spark Resilient Distributed Dataset (RDD), which is a fault-tolerant collection of elements that can be operated on in parallel. The value of SNAP_COMMITSEQ (which is a unique, ordered, non-dense identifier of a transaction boundary generated by the capture engine 160) is used to determine the endpoint of the last fetch. There are two possible solutions: a centralized parallel transmission and a decentralized parallel transmission.

With the centralized parallel transmission, after each apply engine 110 cycle, one thread from the thread pool 106 checks whether records for the new transactions are inserted into a UOW table 143 using a query such as query (1):

select max(SNAP_COMMITSEQ) from SNAP_UOW

Thus, the commit sequence identifier (COMMITSEQ) column of the UOW table 143 is used to determine whether there are records for new transactions.

The thread compares the retrieved maximal value with the one retrieved in the last fetch. If these are different, that means records for the new transactions are already inserted into the SNAP_UOW table 143 and change data tables 142. The ready/free threads in the thread pool 106 may use this boundary to fetch the records for the new transactions from the change data tables 142 and the UOW table 143 using queries such as the following:

```
select max(SNAP_COMMITSEQ) from SNAP_UOW where
    SNAP_COMMITSEQ > LAST_MAX_COMMITSEQ
select * from TAB_1_CD where
    SNAP_COMMITSEQ > LAST_MAX_COMMITSEQ
...
select * from TAB_n_CD
    where SNAP_COMMITSEQ > LAST_MAX_COMMITSEQ
```

Each cycle of fetches ensures the parallel transmission ended at the same point-in-time (LAST_MAX_COMMITSEQ). This is for snapshot consistency.

With decentralized parallel transmission, all the threads used for remote DBMS retrieval regularly keep fetching the values using the above query (1). If any new row is returned, the corresponding LAST_MAX_COMMITSEQ is updated. The next fetch is based on the updated boundary value to do the next fetch. In certain embodiments, the changes are inserted into a corresponding internal queue or an external file as new messages, and another thread consumes these new messages to rebuild the consistent change data table 142 at the target data store. In certain alternative embodiments, a UOW table chunk and a change data table chunk are joined before inserting the changes into the internal queue or a file. In yet other embodiments, table joining may be skipped if consistent change data (consistent change records) is not needed.

With embodiments, as an alternative to a long running multi-threaded application, for a lighter workload or tables that are less frequently updated, such as tables storing less updated properties, a triggering mechanism may be used. The following is example pseudo code in SQL:

```
CREATE TRIGGER replicate2spark_k
    AFTER insert on TAB_k_CD
    FOR EACH ROW
    WHEN ( SNAP_COMMITSEQ > LAST_MAX_COMMITSEQ)
    BEGIN ATOMIC
    VALUES(Spark_Fetch_Invocation_UDF(REST_API));
    END
```

In block 404, the apply engine 110 rebuilds a relational change history with transaction snapshot consistency to generate consistent change records by joining the change data tables and a UOW table based on a commit sequence identifier. With embodiments, the commit sequence identifier is determined using the UOW table 143 and query 1. The result of the join is saved in the replication tables 126. In block 406, the apply engine 110 stores the consistent change records on the big data platform in the external data store 120 (e.g., in replicated tables 126). Such storage of block 406 replicates the consistent change records. In block 408, the big data platform responds to queries (from the analytics engine 190) using the consistent change records. Transaction snapshot consistency ("snapshot consistency") may be described as enabling read operations made in a transaction to see a consistent snapshot of the DBMS 140 (e.g., by reading last committed values that existed at the time the read operation started), and the transaction itself commits if no updates it has made conflict with any concurrent updates made since that snapshot.

With embodiments, the rebuilding of block 404 may be done with option 1 or option 2. With option 1, which is the more expensive way, let the source DBMS 140 build the change data table by: joining the change data table 142 and the UOW table 143 on the column SNAP_COMMITSEQ in the initial DBMS remote fetching.

With option 2, which is the less expensive way, the target external data store processing engine (e.g., a Spark engine) completes the table joining with either coordinated table joining or highly parallel table joining.

With coordinated table joining, each row in the UOW table 143 is fetched once. The fetched UOW rows are shared by all the other threads who fetch change data tables 142. Thus, all the change data table fetch threads wait for the results of the UOW fetch. In a highly distributed cluster, the node for fetching the change data tables 142 has to wait for completion of data replication of the UOW rows.

With highly parallel table joining, the threads will not share the UOW table rows. Every thread maintains a separate LAST_MAX_COMMITSEQ and fetches separate UOW table chunks. With embodiments, the fetching speeds and volume of each thread may be different. This solution may be highly parallel in a distributed cluster.

Figure 5:
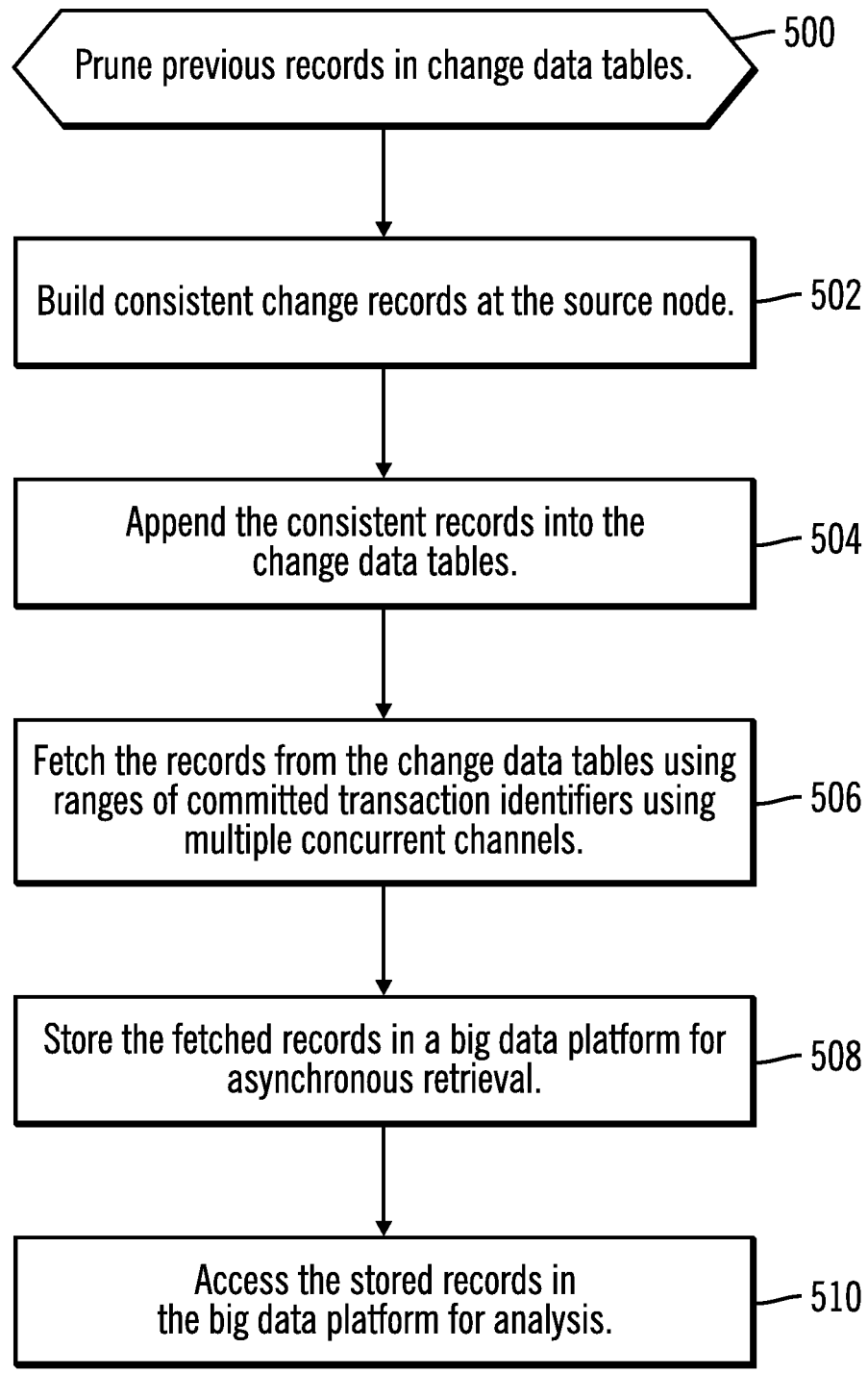
FIG. 5, illustrates, in a flow chart operation in accordance with certain embodiments.

FIG. 5, illustrates, in a flow chart, more detailed operations for recovery log analytics in accordance with certain embodiments. Control begins at block 500 with the capture engine 160 pruning previous changed records in change data tables. In block 502, the capture engine 160 builds consistent change records at the source node (by joining the change data tables and a UOW table based on a commit sequence identifier as in block 404). In block 504, the capture engine 160 appends the consistent change records into the change data tables 142. In various embodiments, the change data tables 142 may be stored in the source node, in the target node or a storage media between the source node and the target node. In block 506, the apply engine 110 fetches records from the change data tables 142 using ranges of committed transaction identifiers using multiple concurrent channels. With embodiments, the multiple concurrent channels are multiple communication logical pipes for shipping the records (or messages) from source to target. With embodiments, this may be other software that sits in-between the apply engine 110 and the capture engine 160. In block 508, the apply engine 110 stores the fetched records in a big data platform for asynchronous retrieval. In various embodiments, the destination may be a temporary cache or persistent media. In block 510, an analysis engine 190 accesses the stored records in the big data platform for analysis.

In certain embodiments, there is pruning of the change data tables 142 (block 500) or pruning of both the change data tables 142 and the UOW tables 143 (after the processing of block 402 and before the processing of block 404). The pruning may be: apply-progress-driving pruning, event pruning, or retention-limit-based pruning. With embodiments, the transactional data tables 144 are not pruned.

With apply-progress-driven pruning via single-channel notification, in the capture side, each apply engine 110 has one row for recording the apply progress at the target node. The value of SNAP_COMMITSEQ in this row represents all the rows whose SNAP_COMMITSEQ is less than the value of LAST_MAX_COMMITSEQ that have been applied.

Each registered table maintains its local apply progress. When the change data table 142 copies have been persistently recorded in the target side, the apply engine 110 threads report the latest apply progress to the capture engine 160. In certain embodiments, the underlying data structure is a concurrent hash map. With embodiments, the concurrent hash map records the apply progress at the target node. Because there are multiple replication channels and multiple apply agents, a concurrent hash map may be used as the underlying data structure for recording the apply progress. In this data structure, each table has its own apply progress, which is represented by LAST_MAX_CIMMITSEQ. With embodiments, one thread monitors the apply progress and may be referred to as a "monitoring thread". The monitoring thread may use the LAST_MAX_COMMITSEQ of the slowest fetching thread. The monitoring thread updates the corresponding row to notify the capture engine 160 that it can prune all the rows whose SNAP_COMMITSEQ is less than the value of LAST_MAX_COMMITSEQ. the capture engine 160 has a single prune thread that monitors the progress of all the apply engines 110 and prunes the change data tables 142 and the UOW tables whose rows have been applied by all the apply engines.

With event pruning, an application or a user determines when to prune the change data tables 142 and the UOW tables. The application or user inserts a row into the events structure 168 (which may be a capture control table). When the capture engine 160 sees that row, the capture engine 160 begins replicating. Such pruning may be automated by using database triggers (such as in the example pseudo code in SQL).

Retention-limit-based pruning is also known as relative timing for scheduling the pruning. The schedule may have intervals for pruning. An interval may be approximate, which depends on the workload or system resource available at the time. During retention-limit pruning, the capture engine 160 checks for those records in the UOW tables whose ages are greater than the user-specified RETENTION_LIMIT value. The capture engine 160 then removes these old records from the change data tables 142 and the UOW tables 160. While normal pruning removes rows that have been copied by the apply engine 110, retention-limit pruning removes even those rows that have not been copied by the apply engine, but have been retained longer than the retention period. With embodiments, the capture engine 160 performs retention-limit pruning when it starts in warm mode or when the prune command is issued manually. With embodiments, retention-limit pruning is not automatic; that is, retention-limit pruning is not done during every prune cycle. The following is an example SQL pseudocode for implementing the pruning:

prunepoint(n)=Min (SELECT MAX(SNAP_COMMITSEQ)
FROM ASN.SNAP_UOW U
WHERE U.SNAP_LOGMARKER<(CURRENT TIMESTAMP−:retention_limit MINUTES));

Embodiments provide a hybrid pruning mechanism. In particular, embodiments provide three different pruning mechanisms, which are integrated into a hybrid solution. The different pruning mechanisms are designed for different purposes. Users are allowed to activate all of them in the same configuration. In certain embodiments, a priority order may be used, such as:

Event-driven pruning>Retention-limit-based pruning>Apply-progress-driven pruning With retention-limit-based pruning, the records are pruned based on a user-configured retention limit. New apply engines 110 may be added after starting the existing replication services. Keeping the changes in the change data tables 142 may avoid unnecessary/slow reading/parsing from the DBMS log, when a new apply engine 110 is added to the configuration.

The apply-progress-driven pruning separates the slow apply engine 110 from the fast apply engine 110. The pruning progress is decided by the slowest apply engines 110.

The event-driven pruning: users/system may issue an event to trigger the change pruning.

With embodiments, the storage of the change data tables 142 is not un-limited. The pruning events may be triggered by a separate storage monitoring component based on run-time usage of storage.

Embodiments provide optimizations for parallel fetching of a single change data table by either adding a dense sequence ID to each change data table 142 or by using the existing INTENTSEQ column of a change data table 142.

The dense sequence ID (SNAP_RID) added to each change data table 142 is used for detecting potential message/data loss in transmission and target processing. The dense sequence ID may be used for parallel fetching from the source to the target by specifying a dense sequence ID range. The dense sequence ID may be used for determining whether the rows have been processed and recorded in the target system when restarting the target system. The dense sequence ID may be automatically incremented and populated by the DBMS 140 or the capture engine 160. With embodiments, to detect loss, when the target side realizes the dense sequence ID is not continuous, the target side thread will discard the previous fetching and re-fetch the sequence using the expected range. In the standard SQL statement, the dense sequence IDS columns may be created by the following statements:

```
CREATE TABLE customer_CD (
    SNAP_RID INT NOT NULL GENERATED ALWAYS
        AS IDENTITY
        (START WITH 1
        INCREMENT BY 1
        MINVALUE 1
        MAXVALUE 1000000
        CYCLE
        ORDER),
    ... )
```

Thus, embodiments provide range-based data fetching for a single change data table 142. Source-side batch jobs may generate highly unbalanced change workloads across different change data tables. Within a short time interval, there may be many data changes happening in a specific table. Traditional table-based parallelism is not enough for latency-sensitive analytics tasks. On the other hand, embodiments provide a range-based data fetching solution based on a dense sequence ID or a log sequence number. Embodiments introduce a dense sequence ID in each change data table 142. In the target side, the data changes may be fetched based on the dense sequence ID ranges. Thus, for a distributed processing system, the range based parallel fetch and analysis may be much faster than table based processing. In addition, the dense sequence ID is also used as the restart point and for data loss detection.

The INTENTSEQ column is a unique identifier of each database change within the change data table 142. The INTENTSEQ identifier is not a dense identifier, so it is not used for loss detection. However, the INTENTSEQ identifier may be used to generate distinct subsets of data within a single cycle. This may in turn be used for parallel selects using the following example statement:

SELECT SNAP_INTENTSEQ FROM CD TABLE WHERE SNAP_COMMITSEQ BETWEEN LAST_MAX_COMMIT_SEQ AND NEW_MAX_COMMIT_SEQ AND RAND<[sampling factor]

Embodiments store consistent change records. The target storage may be chosen in a different format than the source/DBMS storage. In one embodiment, an Apache® Parquet® format file is chosen as follows:

```
SNAP_COMMITSEQ varchar - This is a unique,
ordered, non-dense identifier of a transaction boundary generated by the
capture engine 160.
    SNAP_INTENTSEQ varchar - This is a unique,
ordered, non-dense identifier of an individual row change generated by
the capture engine 160.
    SNAP_OPERATION char - This corresponds to Insert,
    Update, Delete
    [ user column 1 before image  - This corresponds to
the column value of a row change on deletes or the old value
before an update
        user column 1 after image  - This corresponds to the
column value of a row change on insert or the new value after an update
    ....
        user column N before image
        user column N after image ]
```

With embodiments, for each apply engine 110 in a specific target system, each change data table 142 has one file until reaching the size limit. Then, a new file is created for the following writing. The file path/name record the starting time of the capture engine 160, the source table name, a subscription name, the starting dense ID, and the expected ending dense ID and the row count in this file. The change data table 142 is hence partitioned physically by time and supports efficient time range query.

If the file format does not support the crash recovery mechanism, embodiments have two in-rotation commit files. All the new changes append to the same file. For avoiding the crash (e.g., a power crash outage), embodiments record the dense sequence ID and its checksum after committing the writing of these new rows.

In other embodiments, the changes are also inserted to an external queue for streaming applications (for example, Apache® Kafka®). (Apache and Kafka are registered trademarks of the Apache Software Foundation in the United States and/or other countries.)

With embodiments, metadata may be stored in the DBMS 140 with subscription information. With reference to the metadata, in this remote media DBMS 140, the values may be updated, inserted, and deleted. In the local media, the file is append-only. Embodiments store the subscriptions and metadata in the source-side DBMS 140. The metadata includes the source schema name, table name, the subscribed column names, the subscription state of this table. When starting the apply engine 110, there is a read of the metadata in the remote DBMS 140 to obtain the subscription information. A separate tool may be used to manage such a persistent information media. With other embodiments, the metadata may be stored elsewhere.

That is, all the metadata information is stored in the source system. Most of big data file systems are append-only. Each target regularly records the progress in the source-side tables. This progress may also be used for apply-progress-driven pruning. When having multiple targets, this centralized design improves the usability and simplify the system monitoring.

With embodiments, an analysis engine 190 consumes the generated files that are continuously updated with newly captured changes occurring in the DBMS 140. The changes are reported back to the DBMS 140 or stored in a local file system. The file reading may be online or offline. With embodiments, the changes may be reported back to the DBMS 140 for querying the analysis results because the DBMS 140 has a better support for complex querying processing and concurrency control.

With reference to query answering, the analysis module 190 reads the output files, filters the unqualified rows, and report the rows. Users may query streaming history using the source side commit time. Users may read the reported analysis results. Also, an affiliate data structure, such as index, may be created to accelerate the query performance.

As for fan-out replication for minimized change capture cost, the DBMS transaction recovery log reading is a resource intensive job. In addition, the capture engine 160 needs to satisfy fault tolerance and high availability. With traditional solutions, one capture engine 160 sends the same set of data changes to multiple different end points, so, when one endpoint goes down, the whole service needs to be re-configured with service interruption. On the other hand, embodiments add a staging area (e.g., a queue) between the capture engine 160 and the apply engine 110 to decouple the operations between them. This enables the handling of dynamic resource allocation on the capture side and the apply side separately, without interrupting service continuity. In addition, to reducing the computation burdens on the source system, embodiments off-load computation tasks from the source side (DBMS) to the target side when re-constructing consistency data.

Embodiments use high scalability features of the big data platform on the apply side. With traditional solutions, when the target system is a cluster of distributed machines, the apply engine is deployed in each node, and there is no support for dynamic adjustment. For example, to deploy an apply engine in a newly added node, a user has to manually reconfigure the setup, and the data replication mode is record by record. On the other hand, embodiments use the resources adjustment features in the big data platform and obtain better performance by batching records for replication. With this, the replication throughput is not limited by the performance of a single node and scales with a big data platform cluster.

Embodiments provide asynchronous temporal travel support over all the replicated tables. Analytical queries on the historical data is useful for customers in business analysis and Information Technology analysis. For example, finding the trend of stock trading of one specific account. Synchronous temporal support inside DBMS is expensive, regarding CPU costs (MIPS), storage costs and response time. Embodiments implement a near-real-time scalable database replication solution from DBMS to a distributed processing system. In this framework, users may take advantage of a cluster of commodity machines to analyze the data and data changes happening in the DBMS 140. For example, the customers may perform the following tasks in the target side (e.g., a cluster):

1) fetch a snapshot copy of any source-side timestamp;
2) retrieve a change history of a specific key; and
3) find the correlated changes committed in the same transaction.

Embodiments enable the data analysis over the data change history of DBMS in a distributed processing system, such as a big data platform. Data integration is an area where different processing and analytics capabilities converge.

Embodiments analyze the recovery log in external engines through a highly scalable replication technique.

With embodiments, solution, the transactions are rebuilt after the changes have been applied to the target system, if transactional consistency is desired. Thus, change transmission may be conducted in decentralized parallel environments.

Embodiments move the data changes that are fully logged and analyze these data in the big data platform.

Embodiments provide a pull-based replication technique using the change data tables 142.

With embodiments, data changes in the recovery log are captured, and the change history recorded from the recovery log is analyzed in the big data platform.

Embodiments generate an audit log in the big data platform by reading the database transactions recovery log.

Figure 6:
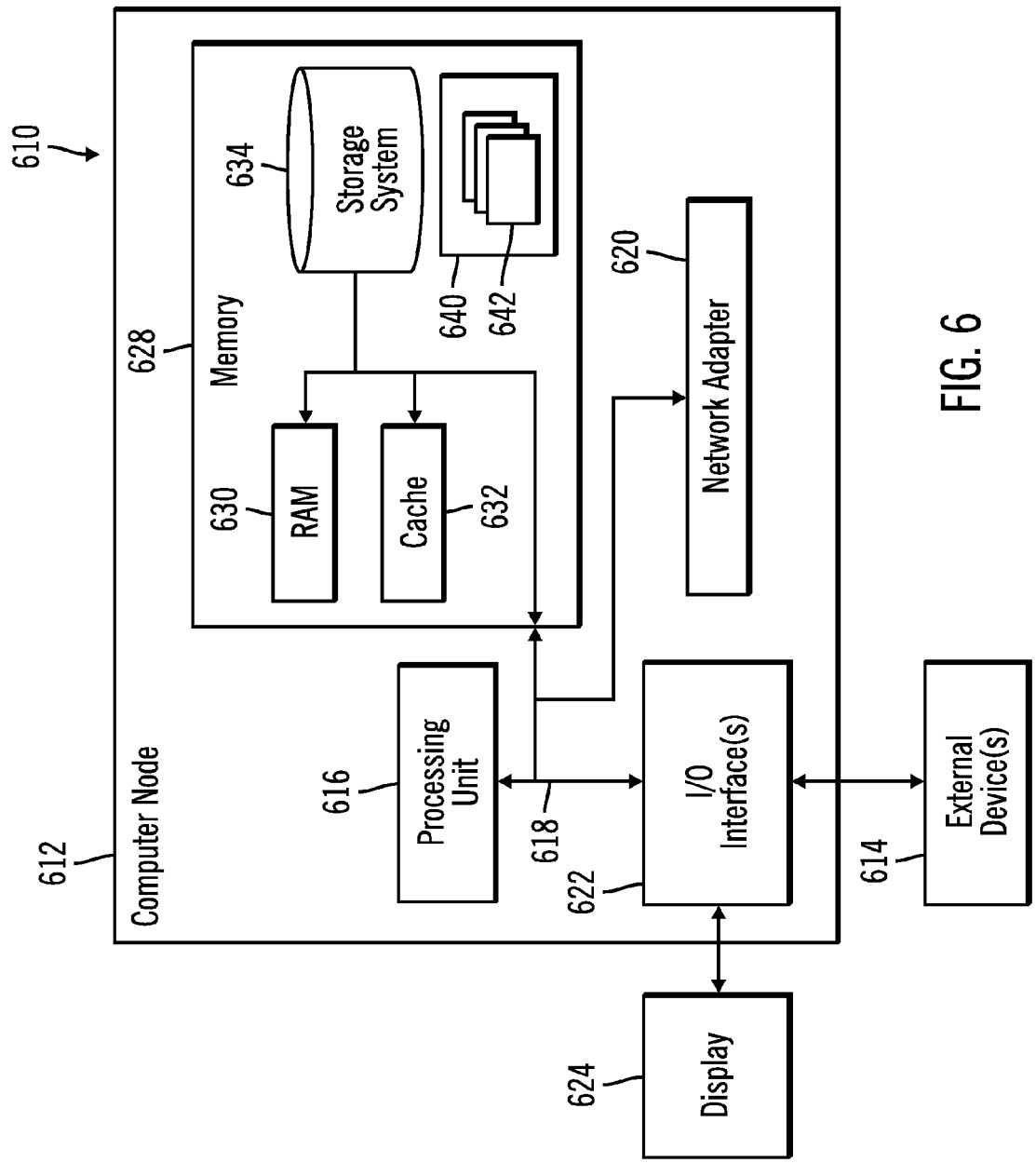
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 in cloud computing node 610 is shown in the form of a general-purpose computing device. The components of computer node 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the big data platform 102, the external data store 120, and/or the DBMS 140 have the architecture of computer node 612. In certain embodiments, the big data platform 102, the external data store 120, and/or the DBMS 140 are part of a cloud environment. In certain alternative embodiments, the big data platform 102, the external data store 120, and/or the DBMS 140 are not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
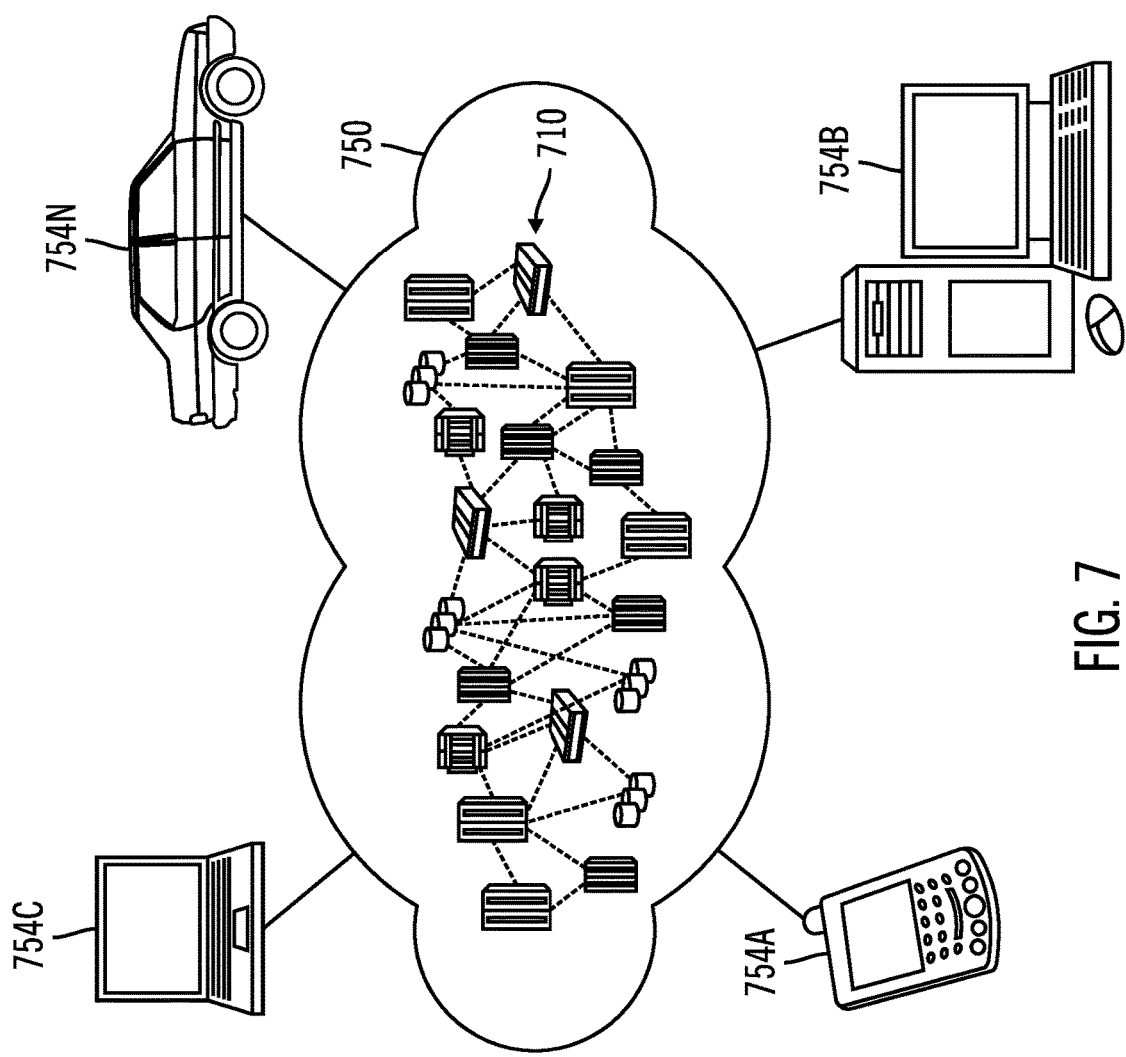
FIG. 7 illustrates a cloud computing environment in accordance with certain embodiments.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
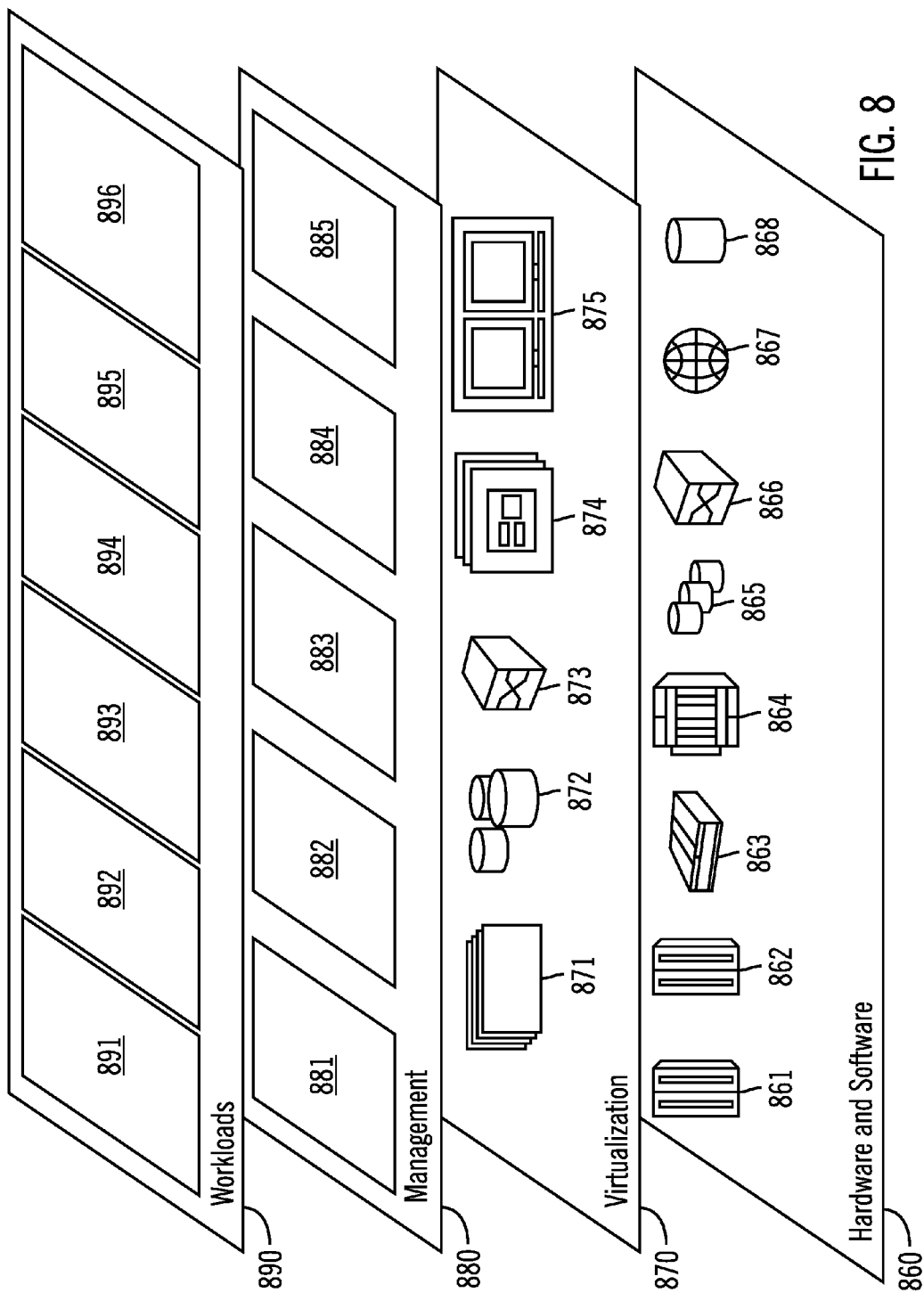
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and recovery log analytics 896.

Thus, in certain embodiments, software or a program, implementing recovery log analytics in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for replicating relational transactional log data to a big data platform, the computer program product comprising a non-transitory computer readable storage medium having program code embodied therewith, the program code executable by at least one processor to perform operations comprising:
    fetching change records contained in change data tables;
    rebuilding a relational change history with transaction snapshot consistency to generate consistent change records by joining the change data tables and a unit of work table based on a commit sequence identifier, wherein the rebuilding is performed by one of a relational database management system and the big data platform; and
    storing the consistent change records on the big data platform, wherein queries are answered on the big data platform using the consistent change records.

2. The computer program product of claim 1, wherein fetching the change records is performed using one of centralized parallel transmission and decentralized parallel transmission.

3. The computer program product of claim 1, wherein the change data tables are pruned.

4. The computer program product of claim 1, wherein analysis of the consistent change records is performed on the big data platform.

5. The computer program product of claim 1, wherein a Software as a Service (SaaS) is configured to perform computer program product operations.

6. The computer program product of claim 1, wherein the unit of work table is used to determine whether there are new records for new transactions in the change data tables.

7. The computer program product of claim 1, wherein metadata is stored that includes a source schema name, a table name of a table, subscribed column names, and a subscription state of the table.

8. A computer system for replicating relational transactional log data to a big data platform, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    fetching change records contained in change data tables;
    rebuilding a relational change history with transaction snapshot consistency to generate consistent change records by joining the change data tables and a unit of work table based on a commit sequence identifier, wherein the rebuilding is performed by one of a relational database management system and the big data platform; and
    storing the consistent change records on the big data platform, wherein queries are answered on the big data platform using the consistent change records.

9. The computer system of claim 8, wherein fetching the change records is performed using one of centralized parallel transmission and decentralized parallel transmission.

10. The computer system of claim 8, wherein the change data tables are pruned.

11. The computer system of claim 8, wherein analysis of the consistent change records is performed on the big data platform.

12. The computer system of claim 8, wherein a Software as a Service (SaaS) is configured to perform system operations.

13. The computer system of claim 8, wherein the unit of work table is used to determine whether there are new records for new transactions in the change data tables.

14. The computer system of claim 8, wherein metadata is stored that includes a source schema name, a table name of a table, subscribed column names, and a subscription state of the table.

\* \* \* \* \*